United States Patent
Hickman (10) Patent No.: US 11,274,779 B2
(45) Date of Patent: Mar. 15, 2022

(54) DIELECTRIC FITTING

(71) Applicant: LEGEND VALVE & FITTING, INC., Auburn Hills, MI (US)

(72) Inventor: David F. Hickman, Auburn Hills, MI (US)

(73) Assignee: Legend Valve & Fitting, Inc., Auburn Hills, MI (US)

( * ) Notice: Subject to any disclaimer, the term of this patent is extended or adjusted under 35 U.S.C. 154(b) by 317 days.

(21) Appl. No.: 16/281,641

(22) Filed: Feb. 21, 2019

(65) Prior Publication Data

US 2020/0271256 A1    Aug. 27, 2020

(51) Int. Cl.
*F16L 25/02*    (2006.01)
*F24H 9/12*    (2006.01)
*F16L 19/065*    (2006.01)

(52) U.S. Cl.
CPC ........... *F16L 25/021* (2013.01); *F16L 25/023* (2013.01); *F16L 19/0656* (2013.01); *F24H 9/128* (2013.01)

(58) Field of Classification Search
CPC .... F16L 25/021; F16L 25/023; F16L 19/0656
See application file for complete search history.

(56) References Cited

U.S. PATENT DOCUMENTS

| | | | |
|---|---|---|---|
| 299,206 A * | 5/1884 | Deavs | F16L 25/023 285/52 |
| 1,848,198 A | 3/1932 | Reid | |
| 1,901,820 A * | 3/1933 | Parker | B23K 1/20 285/93 |
| 2,257,385 A | 9/1941 | Keegan | |
| 2,653,834 A | 9/1953 | Purkhiser | |

(Continued)

FOREIGN PATENT DOCUMENTS

| | | |
|---|---|---|
| CA | 01236779 A | 5/1988 |
| EP | 0937936 B1 | 1/2003 |

(Continued)

OTHER PUBLICATIONS

English Abstract for EP0937936B1.

(Continued)

*Primary Examiner* — Matthew Troutman
*Assistant Examiner* — Alexander T Rufrano
(74) *Attorney, Agent, or Firm* — Fishman Stewart PLLC (57) ABSTRACT

A dielectric fitting includes a nut having inner threads and an axial compression surface, and a hole having a first diameter. A mating component includes outer threads that engage with the inner threads including a second axial compression surface. A first fitting includes a circumferential flange captured between the first axial compression surface and the second axial compression surface, the first fitting having a first wall that extends axially and passes through the first hole and includes first fitting threads. A second fitting includes second fitting threads that engage with the first fitting threads, the second fitting having a second wall and a bulge portion that radially projects to a second diameter and includes an O-ring. The nut and the mating component are dielectrically isolated from the first fitting and the second fitting, and the second diameter is larger than the first diameter.

18 Claims, 4 Drawing Sheets

(56) References Cited

U.S. PATENT DOCUMENTS

| | | | | |
|---|---|---|---|---|
| 2,837,351 | A | * | 6/1958 | Bailey ................... F16L 25/023 285/52 |
| 2,850,299 | A | * | 9/1958 | Risley ................... F16L 25/023 285/48 |
| 3,210,102 | A | | 10/1965 | Joslin |
| 3,346,274 | A | | 10/1967 | Baron |
| 4,130,302 | A | | 12/1978 | Mitchell et al. |
| 4,344,461 | A | | 8/1982 | Beune et al. |
| 4,519,634 | A | * | 5/1985 | Hand ................... G01F 15/185 285/123.12 |
| 4,595,218 | A | * | 6/1986 | Carr ........................ F16L 25/02 285/47 |
| 4,834,430 | A | | 5/1989 | Vassallo et al. |
| 4,848,804 | A | | 7/1989 | Weigl |
| 4,902,049 | A | | 2/1990 | Umehara |
| 4,960,296 | A | | 10/1990 | Thelen et al. |
| 4,991,876 | A | | 2/1991 | Mulvey |
| 5,484,174 | A | * | 1/1996 | Gotoh .................. B21D 39/046 285/382.2 |
| 5,927,763 | A | | 7/1999 | Mehr |
| 6,260,891 | B1 | | 7/2001 | Foering et al. |
| 6,340,181 | B1 | | 1/2002 | Amatsutsu |
| 6,581,983 | B1 | | 6/2003 | Viegener |
| 9,169,953 | B2 | | 10/2015 | Cavagna |
| 9,188,260 | B2 | * | 11/2015 | Spence ................. F16L 13/142 |
| 10,865,914 | B2 | * | 12/2020 | Lawrence ............. F16L 21/022 |
| 2011/0074149 | A1 | | 3/2011 | Matsui et al. |

FOREIGN PATENT DOCUMENTS

| | | |
|---|---|---|
| FR | 2759762 A1 | 8/1998 |
| JP | 5041243 B2 | 10/2012 |
| RU | 2442062 C2 | 2/2012 |

OTHER PUBLICATIONS

English Abstract for FR2759762A1.
English Abstract for JP5041243B2.
English Abstract for RU2442062C2.

* cited by examiner

DIELECTRIC FITTING

BACKGROUND

Fittings, or unions, are commonly used in the plumbing industry to join pipes together. The pipes thereby form a flow path through which liquids, such as water, flow. Applications may include water heaters, water softeners, sinks, and other piping for residential and commercial applications.

Oftentimes, pipes to be connected in plumbing applications are of dissimilar metals, which can cause galvanic corrosion. Galvanic corrosion is an electrochemical process in which one metal corrodes when it is in electrical contact with another metal in the presence of an electrolyte. An electrolyte is commonly known as a substance that produces an electrically conducting solution when dissolved in a solvent. The dissolved electrolyte separates into cations and anions, which can thereby conduct electrical current when an electrical potential is applied. Water and other fluids passed in residential and commercial pipe systems are thereby electrolytes because they include sufficient impurities to be electrically conductive.

An electrical potential is naturally formed between dissimilar metals, and when the dissimilar metals are joined to form a fluid flow path (such as pipes in a piping system), one metal acts as an anode and the other acts as a cathode. Metal ions thereby exchange between the cathode and the anode, with typically the anode metal dissolving into the electrolyte and resulting in corrosion.

Many solutions have been employed to mitigate the effects of corrosion in plumbing and other fluid conveyance systems. For instance, sacrificial anodes may be galvanically coupled to the plumbing system, the sacrificial anode having a greater propensity to corrode than the other metals in the system. Another solution may include corrosion inhibitors. Still another solution may include a thread seal tape or Teflon® tape or a sealing compound that electrically isolates the dissimilar materials from each other.

Such measures, however, may be impractical or too expensive to implement, may be subject to installation error (such as Teflon® tape not being sufficiently applied), they may not provide sufficient protection for the expected life of the system, or such measures may not comply with building codes.

As such, in many applications, manufacturers have developed dielectric joints or unions that connect dissimilar metals to each other while maintaining electrical isolation between components. Typically, such as in a residential plumbing application for a water heater, a dielectric fitting may be used to connect copper piping to an iron-based metal such as galvanized steel or stainless-steel. To prevent galvanic corrosion, the dielectric fitting includes a copper end that is connected to copper pipe, and a threaded stainless-steel end that connects to stainless-steel pipe.

In one such design, the copper and iron-based metal in the dielectric fitting are electrically isolated from one another via dielectric materials. Typically, a copper portion of the dielectric fitting includes a flange that is captured axially by two threaded stainless-steel, or more generally, iron-based components. The two iron-based metal components are screwed together in a fashion that captures the flange of the copper portion, containing the copper portion and providing a fitting that includes the copper portion projecting outward in one axial direction, and a threaded inner portion of iron-based metal on the other end. The copper portion is thereby connected to a copper pipe, and the threaded iron-based metal pipe is screwed into the threaded iron-based metal component of the dielectric fitting.

To effect dielectric isolation in the components of the dielectric fitting, dielectric gaskets are positioned to either side of the flange of the copper portion. Thus, when the iron-based metal components are screwed together to capture the flange of the copper portion, the iron-based metal components compress against the dielectric gaskets and the iron-based metal components do not contact the copper flange or the copper portion. The components are thereby sufficiently isolated from one another. Accordingly, when the dielectric fitting is installed into a plumbing system, galvanic corrosion is avoided because the iron-based metal portion of the fitting is in contact only with iron-based metal of the plumbing system, and because the copper portion of the fitting is in contact only with copper of the plumbing system.

Oftentimes the copper portion of the dielectric fitting includes an O-ring that is positioned to engage against an outer surface of the copper piping from the plumbing system. That is, the piping from, for instance for a residential water system, will include a copper pipe that is inserted into the copper portion of the dielectric fitting, and the O-ring serves as a fluidic seal against an outer surface of the copper pipe.

However, to fit the O-ring into the copper portion of the dielectric fitting, a bulged portion may be included that forms a groove for the O-ring in the copper portion, so that the O-ring can seat properly against the outer surface of the copper piping. The bulge in the copper portion of the dielectric fitting manifests itself as a relatively large radial bulge so that the O-ring can fit within the groove. Thus, the bulge about the circumference of the copper portion can be significantly larger than the portion of the copper portion that is required to merely fit the copper pipe itself.

This is significant because, during assembly of the copper portion into the iron-based metal components, the bulge of the copper portion passes through a hole within the iron-based metal portion that is sized to capture the flange of the copper portion. Thus, the flange is typically larger, radially, than the bulge that is used to provide space for the O-ring. As such, dielectric fittings can be much larger and bulkier than otherwise necessary to provide a flange that can be captured on either side with dielectric materials.

Or, more generally, to provide a sufficiently large bulge to make room for the O-ring, the flange is thereby radially larger than the bulge, which enables the components to be assembled when installed in their application. The dielectric fittings are thereby larger than necessary to simply connect to the copper pipe, which adds not only bulk, but cost as well, to the dielectric fitting.

In addition, dielectric fittings may be repaired on occasion, such as with a fitting that has aged and corroded despite its having dielectric materials therein. Known dielectric fittings may thereby need to be separated from their components (such as a fused attachment to a copper fitting, for example), which may be costly and inconvenient.

Accordingly, there is a need for an improved dielectric fitting.

BRIEF DESCRIPTION OF THE DRAWINGS

Referring now to the drawings, exemplary illustrations are shown in detail. Although the drawings represent representative examples, the drawings are not necessarily to scale and certain features may be exaggerated to better illustrate and explain an innovative aspect of an illustrative example. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows.

DETAILED DESCRIPTION

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

Various exemplary illustrations are provided herein of a high-frequency resonator forming a flow passage for an air induction system and method of fabricating same.

Figure 1:
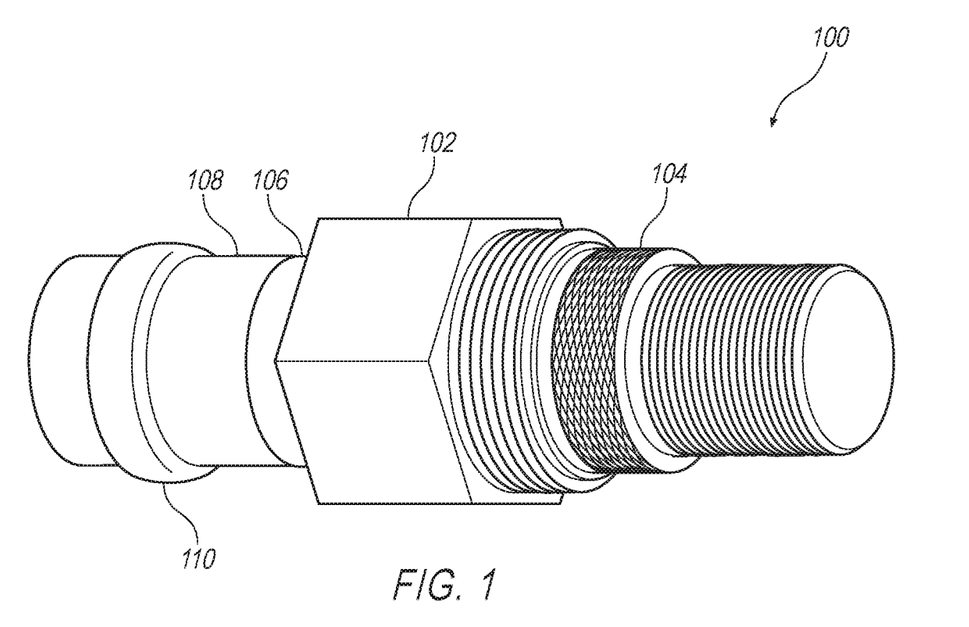
FIG. 1 illustrates an exemplary dielectric fitting assembly.

FIG. 1 shows an exemplary dielectric fitting assembly 100 according to the disclosure that includes a nut 102 and a mating component 104. Assembly 100 includes a first fitting 106 and a second fitting 108 having a bulge 110 that fits an O-ring (not visible) therein on an inner surface.

Figure 2:
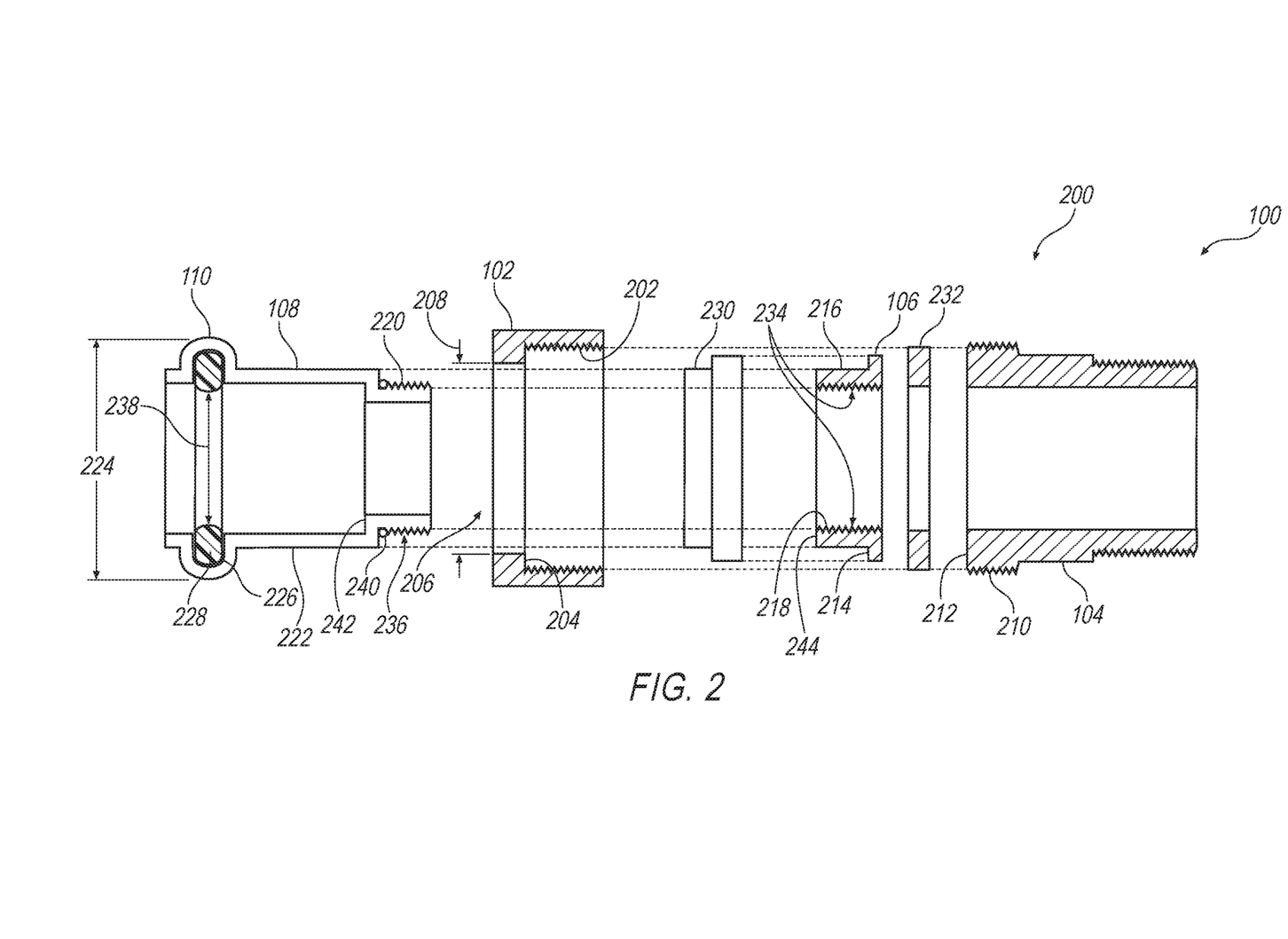
FIG. 2 illustrates an expanded view and cross-section 200 of fitting assembly 100 of FIG. 1.

FIG. 2 illustrates an expanded view and cross-section 200 of fitting assembly 100 of FIG. 1. Exemplary fitting assembly 100 includes a nut 102 having inner threads 202 and a first axial compression surface 204. Nut 102 includes a first hole 206 having a first diameter 208. Mating component 104 includes outer threads 210 that engage with inner threads 202 of nut 102 and include a second axial compression surface 212 that faces toward first axial compression surface 204 when outer threads 210 are engaged with inner threads 202.

First fitting 106 includes a flange 214 that is a radially extending wall captured between first axial compression surface 204 and second axial compression surface 212. Flange 214 in the illustrated example extends outward radially and provides surfaces that may be compressed for sealing purposes. First fitting 106 includes a first wall 216 that extends axially and passes through first hole 206 and includes first fitting threads 218. First fitting threads 218 extend axially and face radially inward. Flange 214 is approximately orthogonal to first fitting threads 218 and the cross-sections of first fitting 106 are thereby approximately L-shaped. Second fitting 108 includes second fitting threads 220 that engage with first fitting threads 218, second fitting 108 having a second wall 222 that extends axially and away from nut 102. Second wall 222 includes bulge or bulge portion 110 that radially projects to a second diameter 224 and includes an inner groove 226 for an O-ring 228. Nut 102 and mating component 104 are dielectrically isolatable from first fitting 106 and second fitting 108. Second diameter 224 is larger than first diameter 208 such that, during assembly, bulge 110 of second fitting 108 is not required to pass through first hole 206. That is, because first fitting 106 and second fitting 108 are separate components, assembly 100 is effected without having to fit bulge 110 through first hole 206.

Still referring to FIG. 2, a first dielectric gasket 230 is captured between first axial compression surface 204 and flange 214, which dielectrically isolates flange 214 from nut 102. A second dielectric gasket 232 is positioned between second axial compression surface 212 and flange 214, which isolates flange 214 from mating component 104. Second dielectric gasket 232 thereby provides not only dielectric separation of components, but provides sealing as well, such that fluids (i.e., liquids and gases) may pass through dielectric fitting 100 without leaking between first fitting 106 and second axial compression surface 212. In one example, first dielectric gasket 230 and second dielectric gasket 232 are fabricated from different materials. For instance, first dielectric gasket 230 may be simply a very inexpensive hard plastic that is compression molded, given that its function is simply to separate components without providing a fluidic sealing function. In contrast, second dielectric gasket 232 may be a rubber or other low durometer material that provides not only dielectric separation, but fluidic sealing. Being of a low durometer material, second dielectric gasket 232 may thereby be readily compressed to provide sufficient sealing for the life of dielectric fitting 100. In another example, nut 102 and mating component 104 are fabricated of the same material, such as galvanized forged steel, but it is contemplated that different materials may be used so long as minimal or no propensity for corrosion is present between nut 102 and mating component 104.

Further, in yet another example, first fitting threads 218 are on an inner circumference 234 of first fitting 106, and second fitting threads 220 are on an outer circumference 236 of second fitting 108. However, although not illustrated, it is contemplated that the positioning of the threads may be reversed, having outer threads on first fitting 106 and inner threads on second fitting 108. In one example, first fitting 106 and second fitting 108 are fabricated of the same material, but it is contemplated that different materials may be used, albeit with materials that may cause minimal corrosion therebetween. That is, first fitting 106 and second fitting 108 may be both fabricated from copper or a copper alloy such as a no lead brass material containing approximately 60-63% copper, in one example, or one may be of copper or a copper mix and the other of a material having only minimal potential with the copper or copper mix, to reduce or eliminate any propensity for corrosion to occur. In addition, cross-section 200 shows another O-ring 240 that is positioned between first fitting 106 and second fitting 108. O-ring 240 is captured proximate outer circumference 236 and at a step 242 of second fitting 108, such that O-ring 240 is compressed by an end 244 of first fitting 106. O-ring 240 thereby provides not only sealing so that liquid does not leak between first fitting 106 and second fitting 108 during operation, but O-ring 240 also provides a resistance when second fitting threads 220 are engaged with first fitting threads 218. Further, in one example, an adhesive such as Loctite® may be used to seal first fitting 106 with second fitting 108 to form a semi-permanent or permanent connection.

O-ring 228 is positioned in inner groove 226, O-ring 228 having an inner diameter 238 that sealingly engages with a pipe (not shown, discussed below in FIG. 4) that is positioned within second wall 222. In one example, the pipe and second fitting 108 are fabricated of the same material, such as copper.

Figure 3:
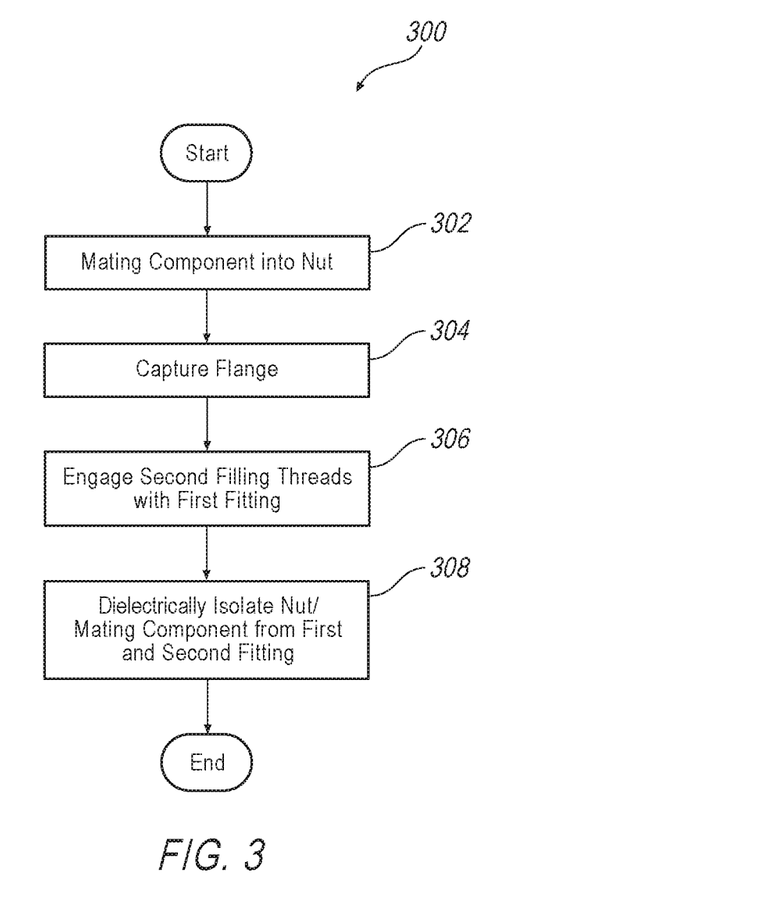
FIG. 3 illustrates steps of a method of fabricating a dielectric fitting, such as the dielectric fitting of FIGS. 1 and 2.

As such, fitting assembly 100 is smaller and more compact than typical or known dielectric fittings. That is, because first fitting 106 and second fitting 108 are screwed together as separate pieces, bulge 110 of second fitting 108 is not required to pass through first hole 206 during assembly of fitting assembly 100. The outer diameter of flange 214 may thereby be smaller than the outer or second diameter 224 of bulge 110, as flange 214 only needs to engage with first axial compression surface 204. Bulge 110 does not pass through Referring to FIG. 3, a method 300 of fabricating a dielectric fitting includes the step 302 of screwing a mating component into a nut having a first axial compression surface, the mating component having outer threads that engage with inner threads of the nut, the mating component having a second axial compression surface that faces toward the first axial compression surface, the nut having a first hole having a first diameter, step 304 of capturing a flange of a first fitting between the first axial compression surface and the second axial compression surface, the first fitting having a first wall that passes through the first hole and includes first fitting threads, and step 306 engaging second fitting threads of a second fitting with the first fitting threads, the second fitting having a second wall that extends away from the nut and a bulge portion that radially projects to a second diameter and includes an inner groove for an O-ring, and step 308 dielectrically isolating the nut and the mating component from the first fitting and the second fitting. The second diameter is larger than the first diameter.

And, although the abovementioned steps are disclosed, it is understood that such steps do not necessarily represent steps that are or must be performed in the disclosed order, but that the disclosed assembly may include different orders of steps.

Figure 4:
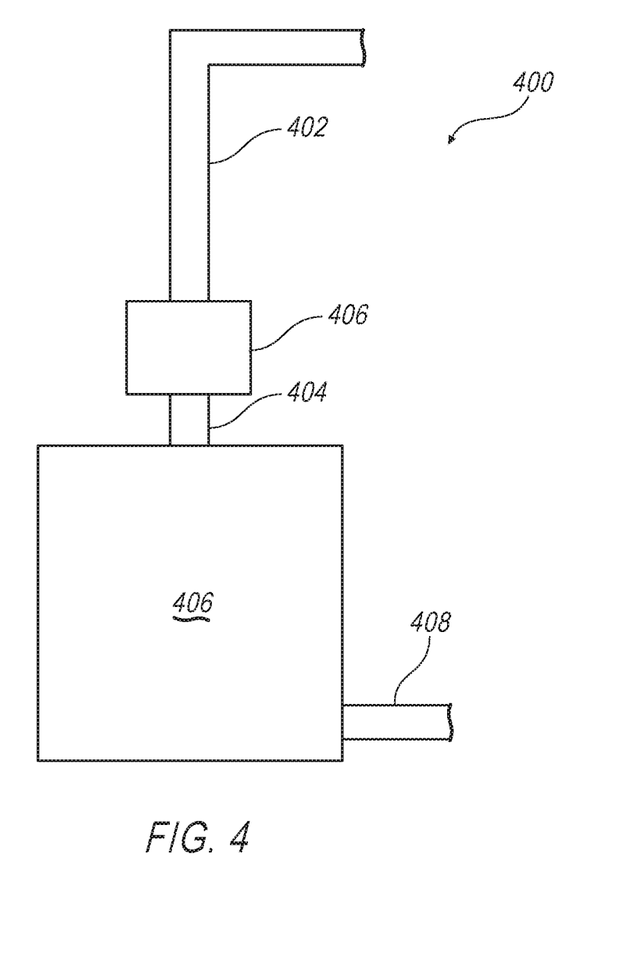
FIG. 4 illustrates a system having a dielectric fitting, according to the disclosure.

Referring to FIG. 4, a fluid system 400 includes a first pipe 402 made of a first material, a second pipe 404 joined to first pipe 402 with a dielectric fitting 406, second pipe 404 made of a second material that is different from the first material. Although only one dielectric fitting 406 is illustrated, it is contemplated that more than one dielectric fitting may be used. That is, it is common to have two dielectric unions, one each on the inlet and outlet piping, with the inlet piping being on the same surface/side of the water heater (inlet and outlet are usually located on the top for tanks and on the bottom for tankless heaters). According to the disclosure, dielectric fitting 406 includes in one example, the components as illustrated and described above with respect to FIGS. 2 and 3, and includes a nut having inner threads and a first axial compression surface, and a first hole having a first diameter, a mating component having outer threads that engage with the inner threads, and having a second axial compression surface that faces toward the first axial compression surface, a first fitting having a circumferential flange captured between the first axial compression surface and the second axial compression surface, the first fitting having a first wall that extends axially and passes through the first hole and includes first fitting threads, and a second fitting having second fitting threads that engage with the first fitting threads, the second fitting having a second wall that extends axially and away from the nut and a bulge portion that radially projects to a second diameter and includes an inner groove for an O-ring that seals against the first pipe. The nut and the mating component are dielectrically isolatable from the first fitting and the second fitting, and the second diameter is larger than the first diameter.

In one example, pipe 402 corresponds with the pipe discussed above with respect to FIG. 2 and is not illustrated in FIG. 2. As such, pipe 402 may be connected to pipe 404 in a fashion that reduces or eliminates dielectric corrosion between components. Pipe 404 may be connected to, for instance, a water heater 406 that heat water that arrives via an inlet 408 and is removed via pipe 404 to flow ultimately through pipe 402 and throughout piping systems such as a residential or commercial water distribution system. In addition, the disclosed dielectric fitting may be readily repaired, instead of having to be entirely replace, in the event that, for instance, one of the sealing features ruptures or fails after extended use (such as, for instance, second dielectric gasket 232). Additionally, threads of the two mating elements (e.g., first fitting 106 and second fitting 108) can be altered for different operations or scenarios because flange 214 is captured between them. Thus, the disclosure provides flexibility of construction and operation to accommodate a wide variety of operations and applications, such as in extreme conditions (i.e., very hot gas environment that may require improved sealing between threads), or in very cold operations (i.e., such as in a cryogenic flow of fluids). Further flexibility is provided in that materials may thereby be selected based not only on their propensity or opportunity to avoid corrosion, but to match material expansion coefficients, as an example, to avoid failure due to a mismatch of material expansion during extremes of operation.

Further, it is contemplated that the disclosed dielectric fitting may be used in any system that links one pipe to another, where there is a propensity for corrosion to occur.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain examples, and should in no way be construed so as to limit the claimed invention.

Accordingly, it is to be understood that the above description is intended to be illustrative and not restrictive. Many applications other than the examples provided would be upon reading the above description. It is anticipated and intended that future developments will occur in the arts discussed herein, and that the disclosed systems and methods will be incorporated into such future examples. In sum, it should be understood that the invention is capable of modification and variation.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A dielectric fitting, comprising:
    a nut having inner threads and a first axial compression surface, and a first hole having a first diameter;
    a mating component having first outer threads at a first end of the mating component that engage with the inner threads of the nut, and having a second axial compression surface that faces toward the first axial compression surface;

a first fitting having a radially external flange at a first end of the first fitting and captured between the first axial compression surface and the second axial compression surface, the first fitting having a first wall that extends axially and passes through the first hole of the nut and includes first fitting threads that are on an inner circumference of the first fitting and extend axially from a second end of the first fitting to the radially external flange; and a second fitting having second wall fitting threads, the second fitting threads on an outer circumference of the second fitting, the second fitting threads at a diameter that is less than a diameter of the second wall and forming a step between the second wall and the second fitting threads, such that an axial surface of the step engages axially with an axially facing surface at the second end of the first fitting when the second fitting threads engage with the first fitting threads;

wherein the second wall includes a bulge portion that radially projects to a second diameter and includes an inner groove for an O-ring;

wherein:

the nut and the mating component are dielectrically isolatable from the first fitting and the second fitting; and the second diameter is larger than the first diameter.

2. The dielectric fitting of claim 1, further comprising a first dielectric gasket captured between the first axial compression surface and the flange, which dielectrically isolates the flange from the nut; and a second dielectric gasket positioned between the second axial compression surface and the flange, which dielectrically isolates the flange from the mating component.

3. The dielectric fitting of claim 2, wherein the first dielectric gasket and the second dielectric gasket are fabricated from different materials.

4. The dielectric fitting of claim 1, wherein the nut and the mating component are fabricated of the same material.

5. The dielectric fitting of claim 1, wherein the first fitting and the second fitting are fabricated of the same material.

6. The dielectric fitting of claim 1, further comprising the O-ring positioned in the groove, the O-ring having an inner diameter that sealingly engages with a pipe positioned within the second wall.

7. The dielectric fitting of claim 6, wherein the pipe and the second fitting are fabricated of the same material.

8. The dielectric fitting of claim 1, wherein the first fitting threads extend along an entire axial length of the inner circumference of the first fitting.

9. The dielectric fitting of claim 1, wherein the mating component further includes second outer threads at a second end of the mating component.

10. A method of fabricating a dielectric fitting screwing a mating component into a nut having a first axial compression surface, the mating component having first outer threads at a first end of the mating component that engage with inner threads of the nut, the mating component having a second axial compression surface that faces toward the first axial compression surface, the nut having a first hole having a first diameter;

capturing a radially external flange of a first fitting at a first end of the first fitting and between the first axial compression surface and the second axial compression surface, the first fitting having a first wall that extends axially and passes through the first hole of the nut and includes first fitting threads that are on an inner circumference of the first fitting and extend axially from a second end of the first fitting to the radially external flange;

engaging second fitting threads of a second fitting with the first fitting threads, the second fitting having a second wall that extends away from the nut and a bulge portion that radially projects to a second diameter and includes an inner groove for an O-ring, the second fitting having the second fitting threads on an outer circumference of the second fitting, the second fitting threads at a diameter that is less than a diameter of the second wall and forming a step between the second wall and the second fitting threads, such that an axial surface of the step engages axially with an axially facing surface at the second end of the first fitting when the second fitting threads engage with the first fitting threads; and dielectrically isolating the nut and the mating component from the first fitting and the second fitting;

wherein the second diameter is larger than the first diameter.

11. The method of claim 10, further comprising capturing a first dielectric gasket between the first axial compression surface and the flange, and dielectrically isolating the flange from the nut.

12. The method of claim 11, further comprising positioning a second dielectric gasket between the second axial compression surface and the flange, and dielectrically isolating the flange from the mating component.

13. The method of claim 10, further comprising positioning the O-ring in the inner groove, positioning a pipe within the second wall, and sealingly engaging an inner diameter of the O-ring an outer diameter of the pipe.

14. A fluid system, comprising:

a first pipe made of a first material;

a second pipe joined to the first pipe with a dielectric fitting, the second pipe made of a second material that is different from the first material;

the dielectric fitting including:

a nut having inner threads and a first axial compression surface, and a first hole having a first diameter;

a mating component having first outer threads at a first end of the mating component that engage with the inner threads of the nut, and having a second axial compression surface that faces toward the first axial compression surface;

a first fitting having a radially external circumferential flange at a first end of the first fitting and captured between the first axial compression surface and the second axial compression surface, the first fitting having a first wall that extends axially and passes through the first hole of the nut and includes first fitting threads that are on an inner circumference of the first fitting and extend axially from a second end of the first fitting to the radially external flange; and a second fitting having second fitting threads, the second fitting having the second fitting threads on an outer circumference of the second fitting, the second fitting threads at a diameter that is less than a diameter of the second wall and forming a step between the second wall and the second fitting threads, such that an axial surface of the step engages axially with an axially facing surface at the second end of the first fitting when the second fitting threads engage with the first fitting threads;

wherein the second wall includes a bulge portion that radially projects to a second diameter and includes an inner groove for an O-ring;

wherein:
the nut and the mating component are dielectrically isolatable from the first fitting and the second fitting; and
the second diameter is larger than the first diameter.

15. The fluid system of claim 14, further comprising:
a first dielectric gasket captured between the first axial compression surface and the flange, which dielectrically isolates the flange from the nut; and
a second dielectric gasket positioned between the second axial compression surface and the flange, which dielectrically isolates the flange from the mating component,
wherein the first dielectric gasket and the second dielectric gasket are fabricated from different materials.

16. The fluid system of claim 14, wherein the nut and the mating component are fabricated of the same material, and wherein the nut and the mating component are fabricated of galvanized forged steel.

17. The fluid system of claim 14, wherein the first fitting and the second fitting are fabricated of the same material, and wherein the first fitting and the second fitting are fabricated from copper.

18. The fluid system of claim 14, further comprising the O-ring positioned in the groove, the O-ring having an inner diameter that sealingly engages with a pipe positioned within the second wall, wherein the pipe and the second fitting are fabricated of the same material.

\* \* \* \* \*